US012519160B2

(12) United States Patent
Yang

(10) Patent No.: US 12,519,160 B2
(45) Date of Patent: Jan. 6, 2026

(54) THERMAL RUNAWAY SUPPRESSANT OF LITHIUM BATTERIES AND THE RELATED APPLICATIONS

(71) Applicants: PROLOGIUM TECHNOLOGY CO., LTD., Taoyuan (TW); PROLOGIUM HOLDING INC., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 353 days.

(21) Appl. No.: 17/372,057

(22) Filed: Jul. 9, 2021

(65) Prior Publication Data

US 2022/0037720 A1    Feb. 3, 2022

Related U.S. Application Data

(60) Provisional application No. 63/087,563, filed on Oct. 5, 2020, provisional application No. 63/058,205, filed on Jul. 29, 2020.

(51) Int. Cl.
*H01M 10/6595* (2014.01)
*H01M 10/0525* (2010.01)
(Continued)

(52) U.S. Cl.
CPC ... *H01M 10/6595* (2015.04); *H01M 10/0525* (2013.01); *H01M 10/613* (2015.04); *H01M 10/625* (2015.04); *H01M 2220/20* (2013.01)

(58) Field of Classification Search
CPC ......... H01M 10/6595; H01M 10/0525; H01M 10/613; H01M 10/625; H01M 2220/20;
(Continued)

(56) References Cited

U.S. PATENT DOCUMENTS 5,750,282 A    5/1998  Chi et al.
9,711,774 B2   7/2017  Liu et al.
(Continued)

FOREIGN PATENT DOCUMENTS

CN    1731601 A    2/2006
CN  101145623 A    3/2008
(Continued)

OTHER PUBLICATIONS

Extended European Search Report issued Jan. 4, 2022 in Application No. 21188016.6.
(Continued)

*Primary Examiner* — Milton I Cano
*Assistant Examiner* — Joshua P Mcclure
(74) *Attorney, Agent, or Firm* — RABIN & BERDO, P.C.

(57) ABSTRACT

The invention provides a thermal runaway suppressant of lithium batteries and the related applications. The thermal runaway suppressant includes a passivation composition supplier, for releasing a metal ion (A), selected from a non-lithium alkali metal ion, an alkaline earth metal ion or a combination thereof, and an amphoteric metal ion (B), a polar solution supplier and an isolating mechanism, which is capable of separating the passivation composition supplier and the polar solution supplier within a predetermined temperature. When the isolating mechanism is failed and the polar solution supplier releases a polar solution to carry the metal ion (A) and the amphoteric metal ion (B) into the lithium battery and react with the positive active material and the negative active material to a state with lower energy. The voltage of the whole battery is decreased and the electrochemical reaction pathway is blocked to prevent the thermal runaway from occurring.

13 Claims, 17 Drawing Sheets

(51) Int. Cl.
*H01M 10/613* (2014.01)
*H01M 10/625* (2014.01)

(58) Field of Classification Search
CPC ......... H01M 10/0567; H01M 10/0569; H01M 4/628; H01M 10/4235; H01M 4/62
See application file for complete search history.

(56) References Cited

U.S. PATENT DOCUMENTS

| | | | |
|---|---|---|---|
| 2005/0130043 A1 | 6/2005 | Gao et al. | |
| 2008/0026283 A1 | 1/2008 | Park et al. | |
| 2008/0241655 A1 | 10/2008 | Ogawa et al. | |
| 2009/0246613 A1 | 10/2009 | Park et al. | |
| 2010/0021801 A1 | 1/2010 | Park et al. | |
| 2010/0273034 A1* | 10/2010 | Hermann | B60L 50/64 429/62 |
| 2010/0279173 A1 | 11/2010 | Hying et al. | |
| 2013/0171484 A1* | 7/2013 | Baginska | H01M 10/0525 429/62 |
| 2014/0147746 A1 | 5/2014 | Tanaka | |
| 2014/0154533 A1 | 6/2014 | Schaefer et al. | |
| 2015/0111086 A1 | 4/2015 | Arnold et al. | |
| 2016/0141720 A1 | 5/2016 | Onozaki et al. | |
| 2016/0351896 A1* | 12/2016 | Yushin | H01M 10/0525 |
| 2017/0146191 A1 | 5/2017 | Gehlhausen et al. | |
| 2017/0214103 A1* | 7/2017 | Onnerud | H01G 11/06 |
| 2017/0338513 A1 | 11/2017 | Chiang et al. | |
| 2018/0019476 A1* | 1/2018 | Qiao | H01M 50/581 |
| 2018/0108879 A1* | 4/2018 | Yang | H01M 50/105 |
| 2018/0190967 A1 | 7/2018 | Fan et al. | |
| 2019/0097265 A1* | 3/2019 | Takshi | H01M 10/654 |
| 2020/0168877 A1* | 5/2020 | Lee | H01M 50/446 |
| 2020/0373584 A1 | 11/2020 | Morin et al. | |
| 2022/0223940 A1* | 7/2022 | Carrasquillo | C04B 26/10 |

FOREIGN PATENT DOCUMENTS

| | | |
|---|---|---|
| CN | 104218193 A | 12/2014 |
| CN | 103500806 B | 5/2016 |
| CN | 106469794 A | 3/2017 |
| CN | 109063410 A | 12/2018 |
| CN | 208336379 U | 1/2019 |
| EP | 3591737 A1 | 1/2020 |
| JP | H10270084 A | 10/1998 |
| JP | H10340739 A | 12/1998 |
| JP | 2010507898 A | 3/2010 |
| JP | 2010287492 A | 12/2010 |
| JP | 2011124074 A | 6/2011 |
| JP | 2016062872 A | 4/2016 |
| JP | 2017142892 A | 8/2017 |
| RU | 2156523 C2 | 9/2000 |
| RU | 2354012 C2 | 4/2009 |
| RU | 2009136983 C2 | 4/2011 |
| RU | 2014106998 A | 9/2015 |
| TW | 201940492 A | 10/2019 |
| WO | WO-2018140304 A1 * | 8/2018 ............. A23L 27/72 |
| WO | 2020005988 A1 | 1/2020 |
| WO | 2020086310 A1 | 4/2020 |

OTHER PUBLICATIONS

Extended European Search Report issued Jan. 7, 2020 in Application No. 21188019.0.
Extended European Search Report issued Jan. 7, 2022 in Application No. 21188020.8.

* cited by examiner

THERMAL RUNAWAY SUPPRESSANT OF LITHIUM BATTERIES AND THE RELATED APPLICATIONS

CROSS REFERENCES TO RELATED APPLICATIONS

This application claims benefit under 35 U.S.C. § 119(a) of U.S. Provisional Patent Application No. 63/058,205 filed Jul. 29, 2020 and U.S. Provisional Patent Application No. 63/087,563 filed Oct. 5, 2020, and the entire contents of which are hereby incorporated by reference for all purposes.

BACKGROUND OF THE INVENTION

Field of Invention

The present invention relates to a safety mechanism of the lithium batteries, in particular to a thermal runaway suppressant of lithium batteries and the related applications.

RELATED ART

Because lithium-ion batteries are widely used in various products, such as vehicles, wearable products for consumers and industrial applications, portable devices and energy storage devices and so on, they are almost applied in all areas of human daily life. However, the event of accidents for the lithium-ion batteries are heard from time to time, such as the fire or explosion of mobile phone batteries and electric vehicles. These are all because the lithium ion batteries still lack comprehensive and effective solutions for safety issues.

The main cause of unsafe event for fire or explosion in the lithium batteries is the thermal runaway. And the main cause of the thermal runaway of the lithium batteries is heat, which is the exothermic reactions result from the thermal cracking, induced by the elevated temperature, of the SEI (solid electrolyte interface) film, the electrolyte, the binder, and the positive and negative active materials in the battery. The current methods for suppression thermal runaway can be classified into two types: outside the battery cell and inside the battery cell, depending on the activated location for safety mechanism. For the type of outside the battery cell, a monitoring system is utilized, which uses digital arithmetic simulation. For the type of inside the battery cell, it can be further divided into physical or chemical methods. In the digital monitoring system outside the battery cell, the dedicated protection circuit and the dedicated management system on the outside of the battery cell are utilized to enhance the safety monitoring of the battery during the usage process. For the physical type of inside the battery cell, such as thermal shutdown separator, at elevated temperature for the battery cell, the holes of the separator are closed to block the passage of the ions.

For the chemical type of inside the battery cell, it can be defined as a scale controlled type or an electrochemical reaction type. In the scale controlled type, the flame retardant is added into the electrolyte to control the scale of the thermal runaway. The examples of the electrochemical reaction types are as follows:

a. The monomer or oligmar is added into the electrolyte. The polymerization will be occurred when the temperature rises to reduce the rate of the ion migration. Therefore, the ionic conductivity decreases as the temperature rises, and the electrochemical reaction rate in the cell slows down;

b. A positive temperature coefficient (PTC) resistance material is sandwiched between the positive electrode layer or the negative electrode layer and the adjacent current collecting layer. When the temperature of the battery cell is elevated, the electrical insulation ability is enhanced. The electric power transmission efficiency between the positive electrode layer or the negative electrode layer between the adjacent current collecting layer is reduced and the electrochemical reaction rate is also decreased; and c. A modified layer is formed on the surface of the positive active material. When the temperature of the battery cell is elevated, the modified layer is transformed into a dense film, which increases the resistance of the charge transfer to reduce the electrochemical reaction rate.

However, the above methods are aimed only for passive blocking the ion/electron migration pathway to reduce the heat generation, not for the main source to generate the maximum energy to cause the thermal runaway and the main reaction body of the entire electrochemical reaction, i.e. the active materials.

Therefore, this invention provides a thermal runaway suppressant of lithium batteries and the related applications by decreasing the thermal energy leading to thermal runaway of the active materials to mitigate or obviate the aforementioned problems.

SUMMARY OF THE INVENTION

It is an objective of this invention to provide a brand new thermal runaway suppressant of lithium batteries and the related applications, which is capable of transferring the positive active material with lithium-ion extraction from an original state with higher electric potential and higher energy to a crystalline state of the metal oxide with lower electric potential and lower energy, and transferring the negative active material with lithium-ion insertion from an original state with lower electric potential and higher energy to an inorganic polymer state with higher electric potential and lower energy. Therefore, the voltage of the whole battery is decreased and the electrochemical reaction pathway is blocked to prevent the thermal runaway from occurring.

In order to implement the abovementioned, this invention discloses a thermal runaway suppressant of lithium batteries, which includes a passivation composition supplier, a polar solution supplier and an isolating mechanism. The isolating mechanism is capable of separating the passivation composition supplier and the polar solution supplier within a predetermined temperature. The passivation composition supplier is capable of releasing a metal ion (A), selected from a non-lithium alkali metal ion, an alkaline earth metal ion or a combination thereof, and an amphoteric metal ion (B). When reaching to the predetermined temperature, the isolating mechanism is failed and the polar solution supplier releases a polar solution to carry the metal ion (A) and the amphoteric metal ion (B) into the lithium battery and react with the positive active material with lithium-ion extraction and the negative active material with lithium-ion insertion to a state with lower energy. Therefore, the voltage of the whole battery is decreased and the electrochemical reaction pathway is blocked to prevent the thermal runaway from occurring.

This invention further discloses a thermal runaway suppressor, which is mixed with a film-forming agent or attached to a structural supporting material to form a film.

This invention further discloses a lithium battery capable of suppressing thermal runaway, including an electrochemical reaction system. The electrochemical reaction system includes a positive active material layer, a negative active material layer, a separator and an electrolyte system. The separator is sandwiched between the positive active material layer and the negative active material layer and the electrolyte system is filled in the electrochemical reaction system. Any one of a surface of the positive active material layer, the negative active material layer, or the separator, and electrolyte system includes the above-mentioned thermal runaway suppressant.

Also, this invention further discloses a lithium battery capable of suppressing thermal runaway, which includes a package component, an electrochemical reaction system, sealed and housed in the package component and a thermal runaway suppressor, disposed outside of the electrochemical reaction system. The thermal runaway suppressor includes a passivation composition supplier, a polar solution supplier and an isolating mechanism. The isolating mechanism is capable of separating the passivation composition supplier and the polar solution supplier within a predetermined temperature. The passivation composition supplier is capable of releasing a metal ion (A), selected from a non-lithium alkali metal ion, an alkaline earth metal ion or a combination thereof, and an amphoteric metal ion (B). When reaching to the predetermined temperature, the isolating mechanism is failed and the polar solution supplier releases a polar solution to carry the metal ion (A) and the amphoteric metal ion (B) into the lithium battery and react with the positive active material with lithium-ion extraction and the negative active material with lithium-ion insertion to a state with lower energy. Therefore, the voltage of the whole battery is decreased and the electrochemical reaction pathway is blocked to prevent the thermal runaway from occurring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
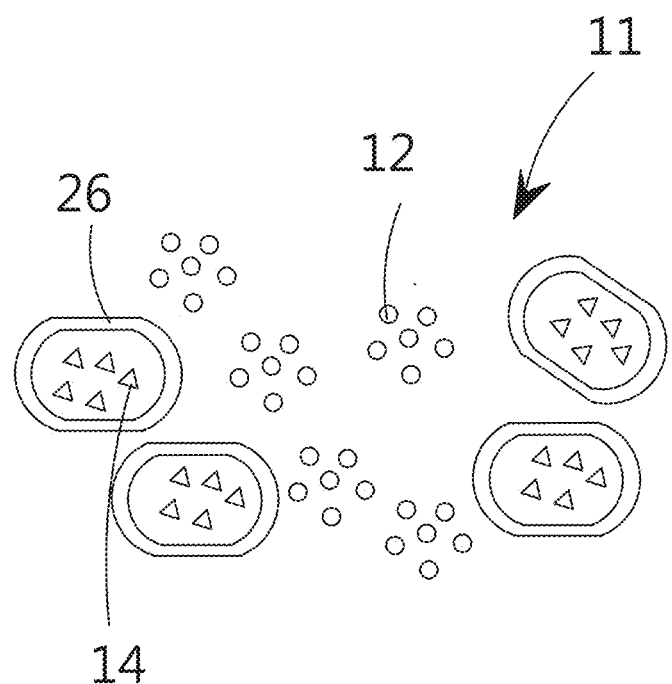
FIG. 1 is a schematic diagram of an embodiment of the thermal runaway suppressant in accordance with the present invention.

The present invention will be described with respect to particular embodiments and with reference to certain drawings but the invention is not limited thereto but only by the claims Any reference signs in the claims shall not be construed as limiting the scope. The drawings described are only schematic and are non-limiting. In the drawings, the size of some of the elements may be exaggerated and not drawn on scale for illustrative purposes.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

First, please refer to FIG. 1, the invention is related to a thermal runaway suppressant 11 of lithium batteries, which includes a passivation composition supplier 12, a polar solution supplier 14 and an isolating mechanism. The isolating mechanism is capable of separating the passivation composition supplier 12 and the polar solution supplier 14 within a predetermined temperature. The passivation composition supplier 12 is capable of releasing a metal ion (A), selected from a non-lithium alkali metal ion, an alkaline earth metal ion or a combination thereof, and an amphoteric metal ion (B). The polar solution supplier 14 is capable of releasing a polar solution to carry the metal ion (A) and the amphoteric metal ion (B) into the electrochemical reaction system of the lithium battery. When the metal ion (A) is selected from the non-lithium alkali metal ion, which is preferably selected from a sodium ion, a potassium ion or a combination thereof. When the metal ion (A) is selected from the alkali earth metal ion, which is preferably selected from a beryllium ion, a magnesium ion or a calcium ion. The amphoteric metal ion (B) is an aluminum ion or a zinc ion. The polar solution supplier 14 is water-releasing compound decomposed endothermically to release water or a pure water. The passivation composition supplier 12 is a solution or an anhydrous powder. When the passivation composition supplier 12 is anhydrous, the polar solution released by the polar solution supplier 14 can act with the passivation composition supplier 12 to dissociate and release the metal ion (A) and the amphoteric metal ion (B). The above-mentioned "carry" means that the polar solution is served as a transmission medium for the metal ion (A) and the amphoteric metal ion (B).

When the temperature of the thermal runaway suppressant 11 reaches to the predetermined temperature, the isolating mechanism is failed due to be cracked, invalidated or destroyed. And the polar solution supplier 14 releases the polar solution to carry the metal ion (A) and the amphoteric metal ion (B), released by the passivation composition supplier 12, to react with the positive active material with lithium-ion extraction and the negative active material with lithium-ion insertion.

For the positive active material, the metal ion (A) will obtain electrons from the positive active material with lithium-ion extraction and deposit thereof, and then further migrate to occupy the positive of the lithium-ion extraction, or intercalation. The positive active material with lithium-ion extraction is transferred from an original state with higher electric potential and higher energy to a crystalline state of the metal oxide with lower electric potential and lower energy. Moreover, it is unstable in structure and easy to release oxygen substance ($O_2$, $O_2^-$, $O^-$) due to the loss of lithium atoms in the original state of the positive active material. The metal atoms formed by the metal ion (A) with electrons, such as the sodium ion will be driven by thermal energy to fill the positive of the lithium-ion extraction, or intercalation, and relocate the lattice to form a new stable state, and at the same time, thermal energy is consumed. Further, when the metal atoms formed by the metal ion (A), such as the sodium, are filled into the positive material, this new stable state structure will represent some of the characteristics of the sodium, due to contain the sodium, such as increased adsorption of moisture. That will increase the insulating properties of the electrodes and result in a decrease in performance.

For the negative active material, the metal ion (A) and the amphoteric metal ion (B) will react with the negative active materials with lithium-ion insertion. The negative active material with lithium-ion insertion is transferred from an original state with lower electric potential and higher energy to an inorganic polymer state higher electric potential and lower energy. Therefore, this invention can achieve to decrease the energy of the positive and the negative active materials and the voltage of the whole battery, by applying the additional metal ion (A) and the additional amphoteric metal ion (B), to block the electrochemical reaction pathway to effectively avoid the thermal runaway of the battery.

Furthermore, for above-defined where the positive active material is transferred from the state with higher electric potential and higher energy to the crystalline state with lower electric potential and lower energy, the detailed description is provided below. The positive active material is in the state with lithium-ion extraction and the electric potential is higher. Also, because of the unstable crystal lattice, the crystal lattice is easy to collapse and has a higher ability to release oxygen, and to release thermal energy violently. Therefore, in the above-mentioned, it is defined that the positive active material is in the state with higher electric potential and higher energy. When the metal ion (A) fills the positions where lithium-ion is extracted or the intercalations, the electric potential of the positive active material is reduced, and the crystal lattice of the positive active material is relatively stable. Also, the stability of the crystal lattice of the positive active material is higher, and the ability of the oxygen-releasing is reduced, and the ability to release thermal energy violently is lowered. Therefore, in the above-mentioned, it is defined that the positive active material is in the passivation state after reacting with the metal ion (A) is defined as the crystalline state with lower electric potential and lower energy.

For above-defined where the negative active material is transferred from the state with lower electric potential and higher energy to the state with higher electric potential and lower energy, the detailed description is provided below. The negative active material is in the state with lithium-ion insertion and the electric potential is lower. In addition, because the negative active material receives the oxygen released from the positive active material, the negative active material is prone to violently combust and release thermal energy. Therefore, the negative active material is unstable and has a higher ability to release thermal energy. Therefore, in the above-mentioned, it is defined that the negative active material is in the state with lower electric potential and higher energy. When the metal ion (A) and the amphoteric metal ion (B) act with the negative active material with lithium-ion insertion, the lithium-ion is captured and form the polymer compound with the base material of the negative active material, such as silicon-carbon. As well as the reduction of the ability to release oxygen of the positive active material, the ability of the negative active material to release thermal energy violently is lowered. Therefore, in the above-mentioned, it is defined that the negative active material is in the passivation state after reacting with the metal ion (A) and the amphoteric metal ion (B) is defined as the polymer compound state with higher electric potential and lower energy. In this state, the negative active material is transformed to the geopolymer, which is a green cement.

In this embodiment, the passivation composition supplier 12 includes at least one compound, which is capable of dissociation and releasing the metal ion (A) and the amphoteric metal ion (B). For example, the compound capable of providing the metal ion (A) may be NaOH, KOH, NaCl, $NaNO_3$, $KNO_3$, or the like. The compound capable of providing the amphoteric metal ion (B) may be $AlCl_3$, $AlBr_3$, $AlI_3$, $Al(NO_3)_3$, $AlClO_4$, $AlF_3$, $AlH_3$, $Zn(OH)_2$, or the like. Also, the passivation composition supplier 12 may be a compound capable of providing both the metal ion (A) and the amphoteric metal ion (B), such as $NaAl(OH)_4$ or the like. But these are just examples, not intended to limit the type and quantity of compounds used in the present invention.

The above-mentioned water-releasing compound decomposed endothermically to release water may be selected from $Al(OH)_3$, $Al(OH)_3.H_2O$, $Mg(OH)_2$, $NH_4H_2PO_4$, $NaHCO_3$, $CH_3COONa.3H_2O$, $ZnOB_2O_3H_2O$, $Na_2B_4O_7.10H_2O$, anhydrous CaCl, $CaCl_2.H_2O$, $CaCl_2.2H_2O$, $CaCl_2.4H_2O$, $MgCl_2.6H_2O$, $KAl(SO_4)_2.12H_2O$, $Zn(OH)_2$, $Ba(OH)_2.8H_2O$, LiOH, or a combination thereof.

The isolating mechanism of the present invention can not only avoid the instability caused by direct contact of different materials between the passivation composition supplier 12 and the polar solution supplier 14, but also block the passivation composition supplier 12 and the polar solution supplier 14 from the external environment, such as the components of the electrochemical reaction system, to influence thereof. The isolating mechanism may be a capsule 26 without holes. The material of the capsule 26 is determined by the compound to be contained. For example, when the polar solution supplier 14 is selected from the water-releasing materials, the material of the capsule 26, used to contain the anhydrous passivation composition supplier 12 and/or the polar solution supplier 14, is selected from a material, which is easy to dissolve in water, such as gelatin, gum arabic, chitosan, sodium caseinate, starch, lactose, maltodextrin, poly-l-lysine/alginate, polyethyleneimine/alginate, calcium alginate, polyvinyl alcohol. When the material of the polar solution supplier 14 is the pure water, the material of the capsule 26, used to contain the polar solution supplier 14, is selected from a material, which is not easy to dissolve in water, such as ethyl cellulose, polyethylene, polymethacrylate, cellulose nitrate, silicones, paraffin, carnauba wax, stearic acid, fatty alcohols, stearyl alcohol, fatty acids, hydrocarbon resin, monoacyl glycerol, diacyl glycerol and triacyl glycerol.

Figure 2:
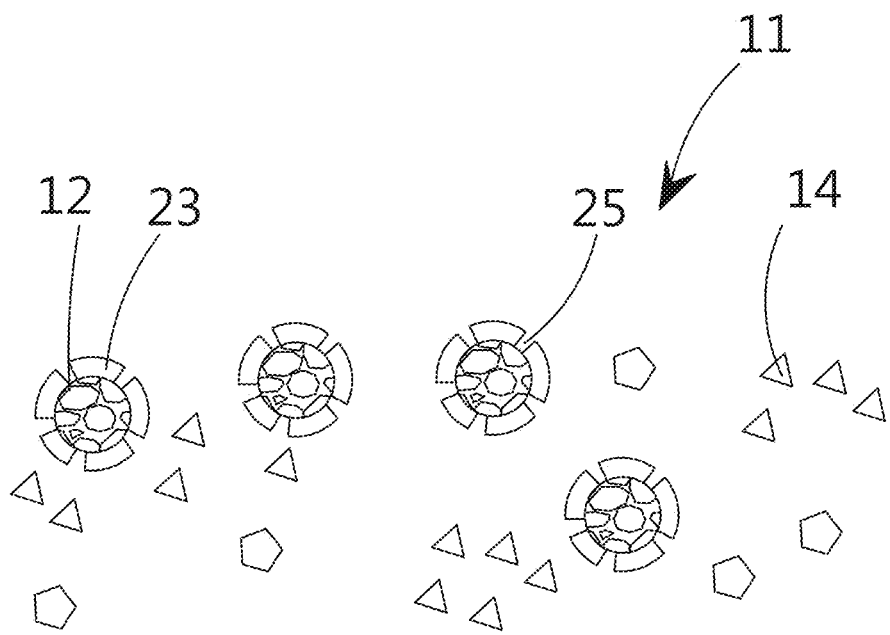
FIG. 2 is a schematic diagram of another embodiment of the thermal runaway suppressant in accordance with the present invention.

When the material of the polar solution supplier 14 is the pure water, in order to increase the volatilization temperature of the water, a high-boiling hydrophilic material may be added in the polar solution supplier 14, such as glycerin or DMSO (dimethyl sulfoxide). Furthermore, when the passivation composition supplier 12 and the polar solution supplier 14 are both in an anhydrous state, the isolating mechanism may be a polymer film 23 with through holes 25 to cover the passivation composition supplier 12 or the polar solution supplier 14, as shown in FIG. 2. In this embodiment, the polymer film 23 with through holes 25 is used to cover the materials in a non-fluid state. When the polar solution supplier 14 releases the polar solution, the polar solution will contact to the passivation composition supplier 12 via the through holes 25 as a transmission path. The polymer film 23 may include a film-forming agent, as described below.

The particle size of the capsule 26 is 1-100 microns preferably. And the capsule 26 may be coated by operating a physical or chemical process. The physical process may be, for example, a solid-liquid phase change based on temperature change or solvent volatilization. The chemical process may be the polymerization of small monomers.

Figure 3:
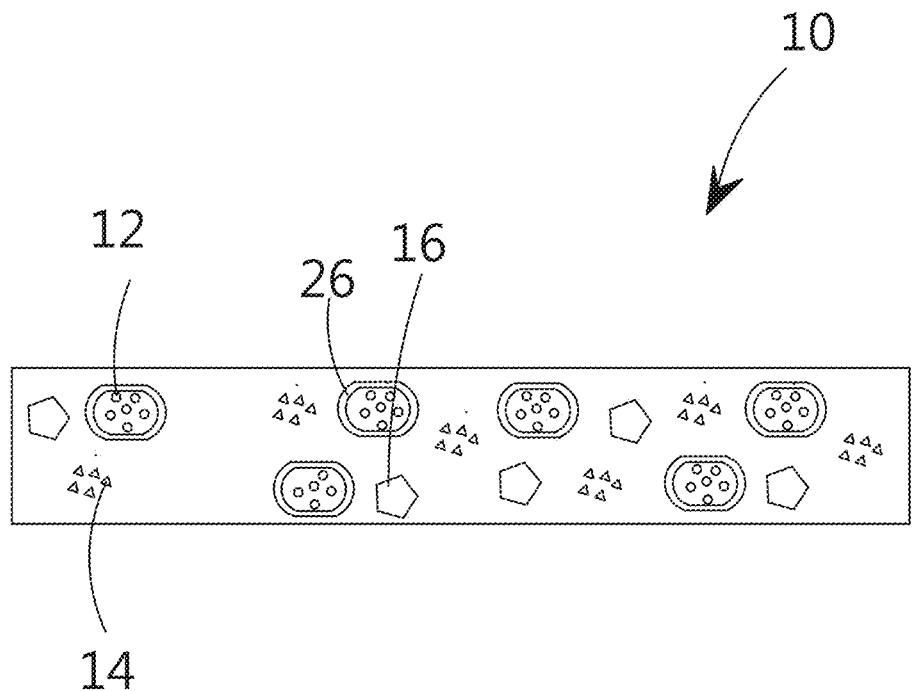
FIGS. 3-6C are schematic diagrams of the various embodiments of the thermal runaway suppressor in accordance with the present invention.
Figure 4:
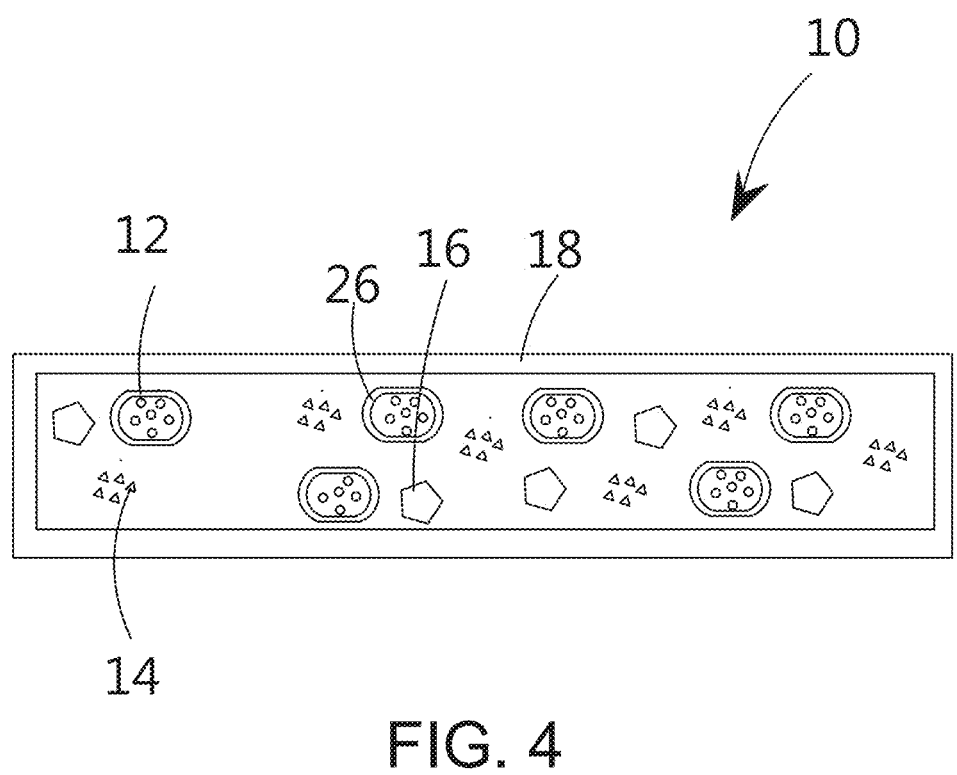

Moreover, the passivation composition supplier 12 and/or the polar solution supplier 14 of the thermal runaway suppressant 11 is mixed with a film-forming agent to form a film-type thermal runaway suppressor 10. For example, Please see FIG. 3, the passivation composition supplier 12 and the polar solution supplier 14 is mixed with a film-forming agent 16 required a solvent to form the film-type thermal runaway suppressor 10 by mixing, coating, drying and pressing processes. Also, one of the passivation composition supplier 12 and the polar solution supplier 14 is encapsulated by the capsule 26 to separate the passivation composition supplier 12 and the polar solution supplier 14. To prevent the external environment, such as the electrolyte of the electrochemical reaction system to influence the passivation composition supplier 12 and the polar solution supplier 14, a protecting layer is coated on the film-type thermal runaway suppressor 10, acted as another isolating mechanism, as refer to FIG. 4. Also, a film-forming agent 16 without solvent required, is used to mix with the passivation composition supplier 12 and the polar solution supplier 14 to form the film-type thermal runaway suppressor 10 by a thermal pressing process. Therefore, the drying process to remove the solvent is not necessary. The film-forming agent 16 without solvent required may be the polytetrafluoroethylene (PTFE). On the other hand, the film-forming agent 16 required a solvent is selected preferably from a material to remove the solvent at around 80° C., such as poly(vinylidene fluoride-hexafluoropropylene) (PVDF-HFP) using the acetone as the solvent, polyurethane (PU) using the butanone as the solvent, or styrene-butadiene rubber (SBR), carboxyl methyl cellulose (CMC) or polyacrylic acid (PAA) using the water as the solvent.

Figure 5:
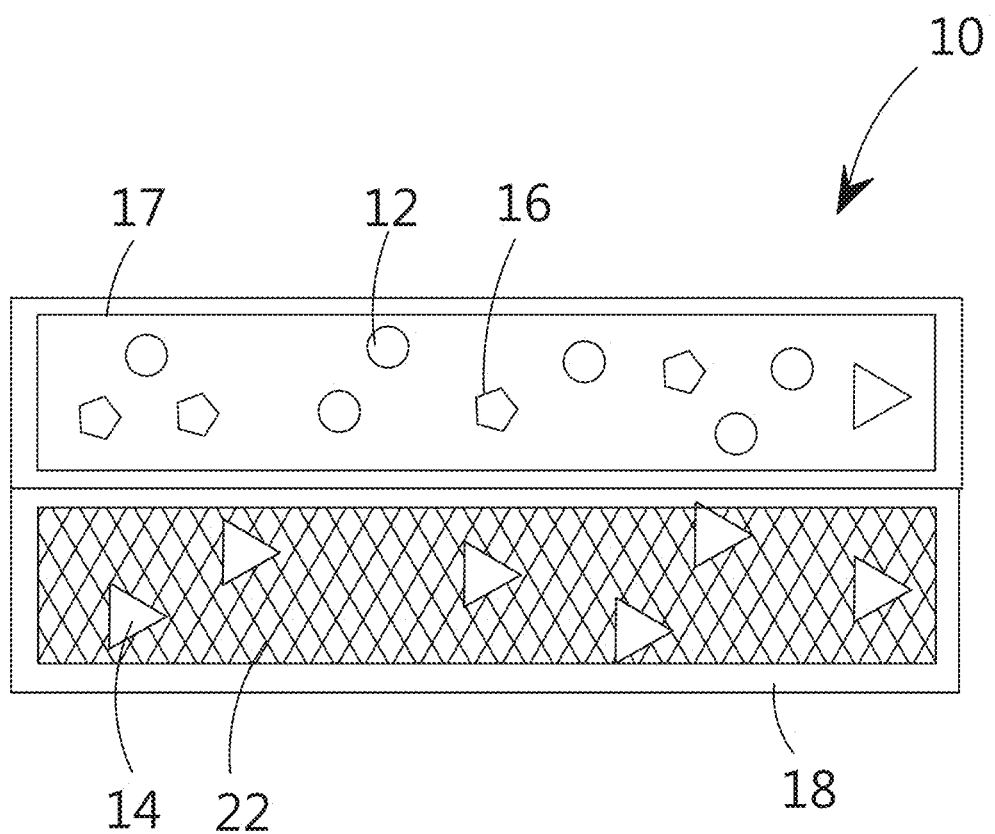

In the above-mentioned embodiments, the passivation composition supplier 12 and the polar solution supplier 14 are mixed together, and the capsule 26 or the polymer film 23 with through holes 25 is served as the isolating mechanism. In the following embodiment, the passivation composition supplier 12 and the polar solution supplier 14 are disposed apart from each other. Please refer to FIG. 5, the polar solution supplier 14 of the thermal runaway suppressor 10 is attached to a structural supporting material 22. The passivation composition supplier 12 is mixed with the film-forming agent 16 to form a film 17. To avoid the instability caused by direct contact of the passivation composition supplier 12 and the polar solution supplier 14, a protecting layer 18 is coated on the outer surface of the structural supporting material 22 to act as the isolating mechanism. Also, the outer surface of the film 17 includes a protecting layer 18. The structural supporting material 22 may be made of a polymer, for example, polyacrylic acid (PAA), sodium polyacrylate (sodium polyacrylate), carboxymethyl cellulose (CMC), polyurethane polymer, guargum, alginic acid sodium salt, polyethyleneimine (PEI), polyethylene oxide (PEO), and polyvinypirrolidone (PVP). When the structural supporting material 22 is fibers, such as a non-woven fabric, and the material may be polypropylene (PP), polyethylene terephthalate (PET) etc. or glass fibers. The structural supporting material 22 may also be composed of polymethyl methacrylate (PMMA) and polycarbonates (PC). In addition, when the structural supporting material 22 is selected from materials that is in a gel state capable of absorbing solutions, such as sodium alginate and sodium polyacrylate, which can directly absorb the compounds in the solution state. When the structural supporting material 22 is selected from materials that is in a gel state, other structural supporting materials with holes, such as non-woven fibers, may also be mixed.

The protecting layer 18 may be composed of the thermosensitive decomposition material, which is selected from paraffin oil, microcrystalline wax, polyethylene wax, low density PE (polyethylene), poly(trans-1,4-butadiene), poly(tetramethylene oxide), isotactic poly(methyl methacrylate), poly(ethylene oxide), poly(ethylene adipate), isotactic poly(1-butene), poly(ethylene). Also, the thermosensitive decomposition material is mixed with a mineral oil to lower softening points.

Figure 6A:
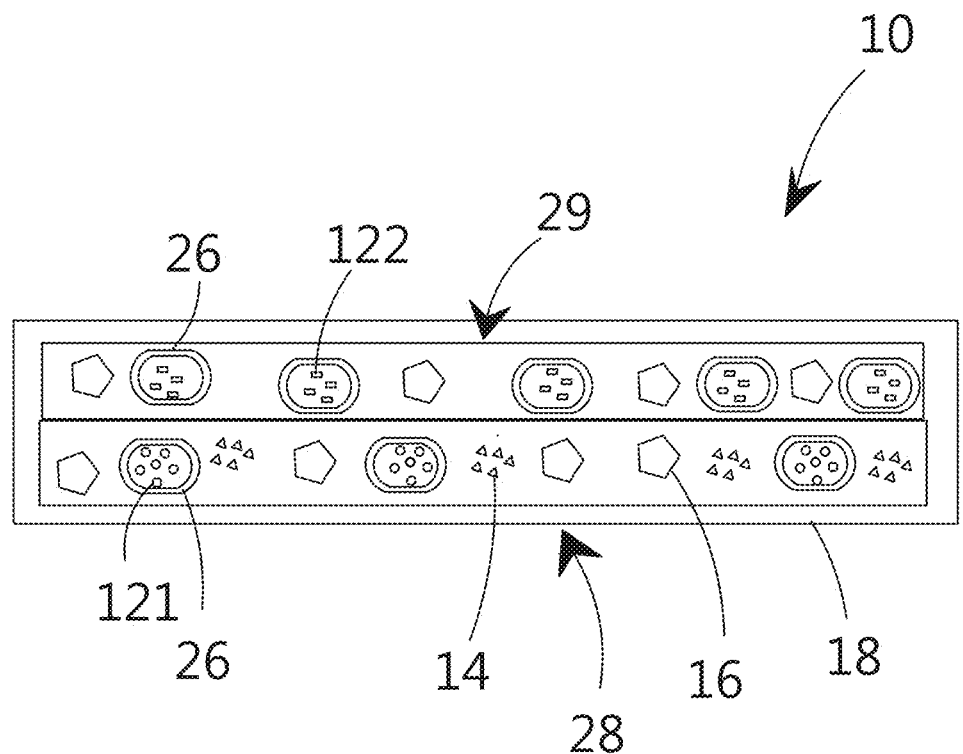

The above-mentioned protecting or film forming methods for the passivation composition supplier 12 and the polar solution supplier 14 can be combined with each other, and are not limited only by those the drawings or the descriptions. For example, when the passivation composition supplier 12 is composed of two compounds 121, 122, the compound 121 is coated with the capsule 26, and mixed with the polar solution supplier 14 and the film-forming agent 16 by mixing, coating, drying and pressing processes to form a first film 28. The compound 122 is coated with a capsule 26 and mixed with the film-forming agent 16 by mixing, coating, drying and pressing processes to form a second film 29. The second film 29 is attached to a surface of the first film 28 to form a layered structure. A protecting layer 18 is used to cover the first film 28 and the second film 29 to block the external environment, as shown in FIG. 6A.

Figure 6B:
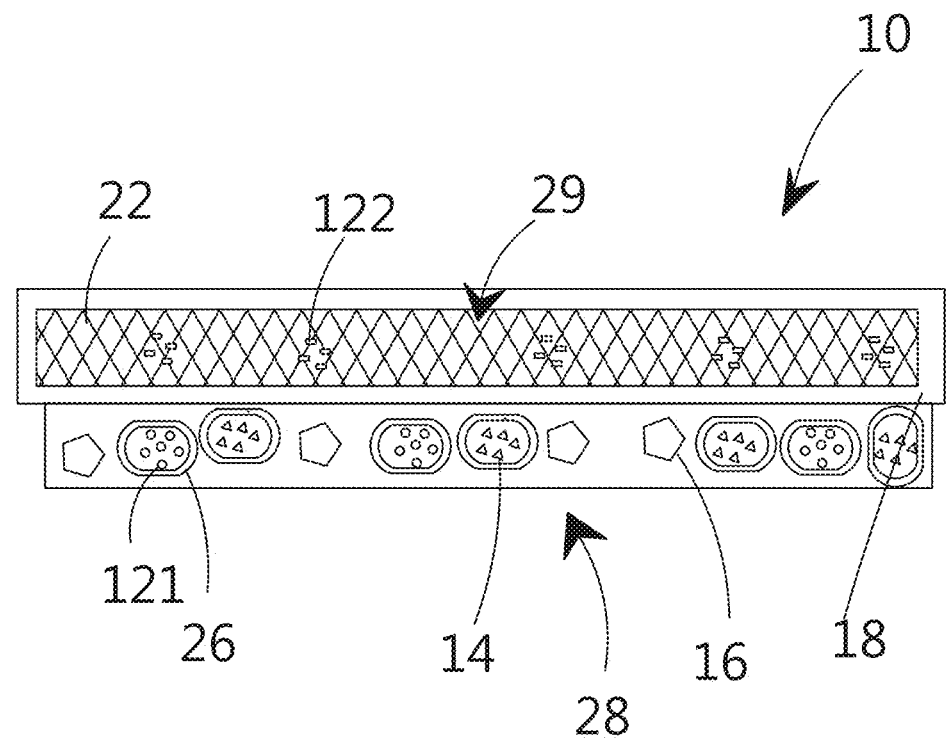
Figure 6C:
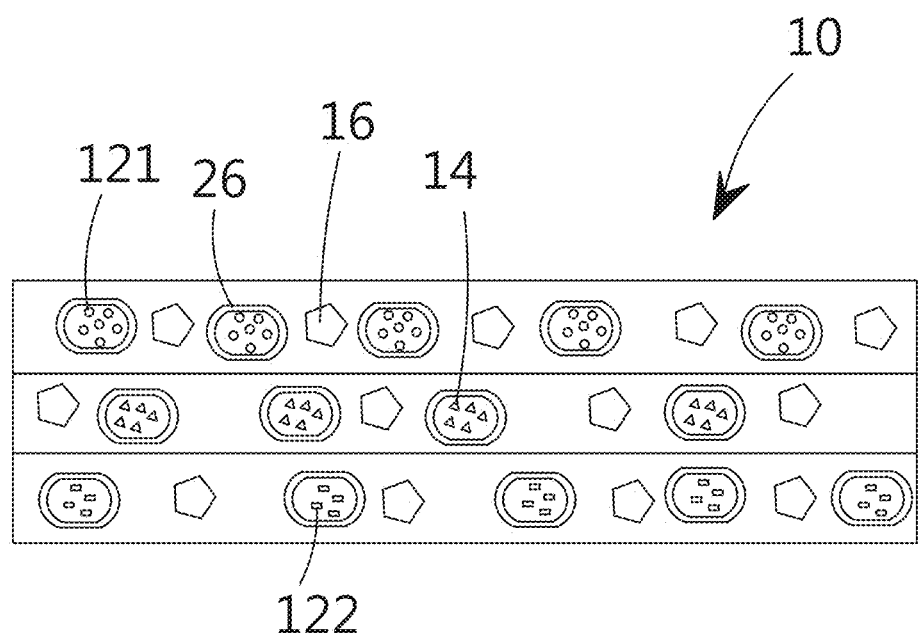

Further, FIGS. 6B, 6C are the other embodiments of the film 10. Please refer to FIG. 6B, the compound 122 is solution-type and attached to the structural supporting material 22 with a protecting layer 18 encapsulation. The compound 121 is mixed with the polar solution supplier 14 and the film-forming agent 16 and encapsulated with the capsule 26 to form the film. Please refer to FIG. 6C, the compounds 121, 122 are mixed with the polar solution supplier 14 and the film-forming agent 16 and encapsulated with the capsule 26 to form the film, respectively. The protecting or film forming methods may be varied or combined by the person skilled art. Such variations are not to be regarded as a departure from the spirit and scope of the invention.

Figure 7A:
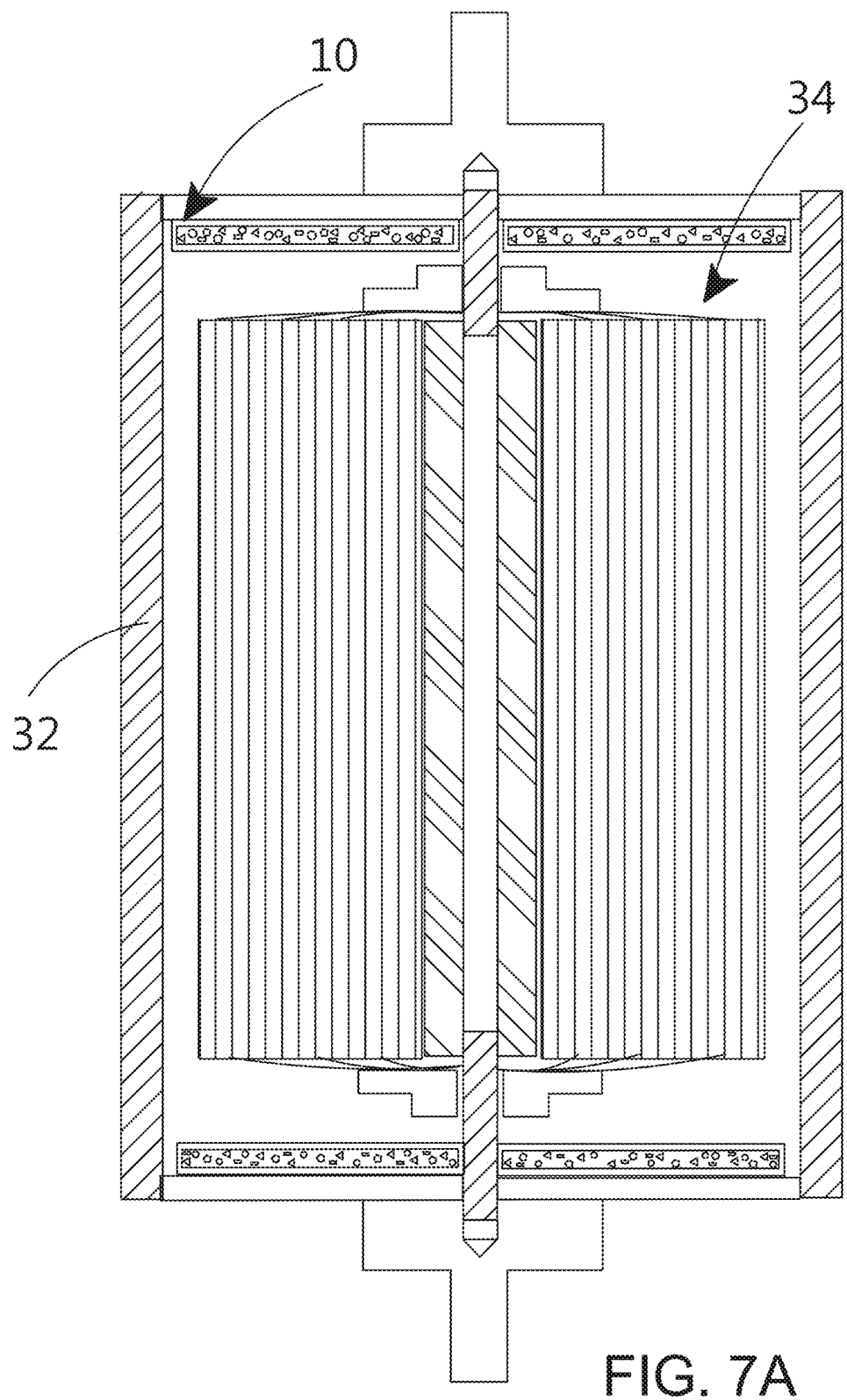
FIGS. 7A-7B are schematic diagrams of the embodiments of a lithium battery with the thermal runaway suppressor in accordance with the present invention.
Figure 7B:
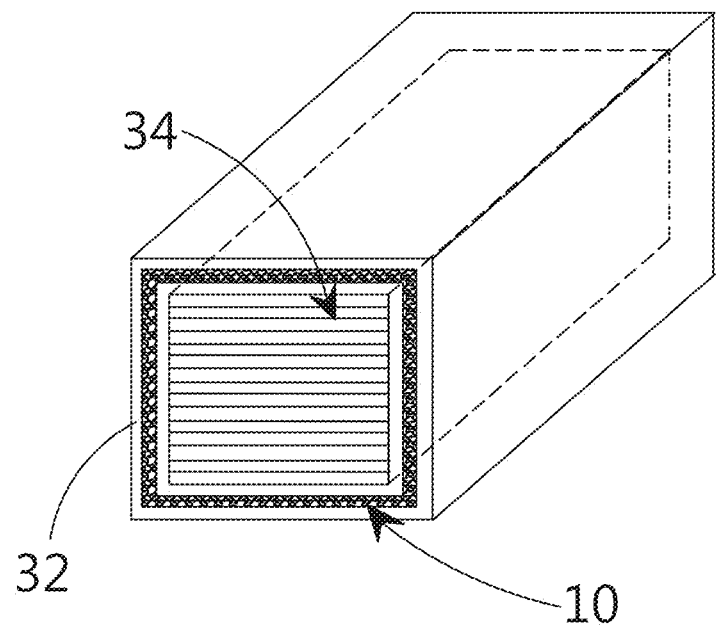

Please see FIGS. 7A-7B, which are the lithium battery structure with the thermal runaway suppressor according to this invention. In practice, without affecting the normal operation of the electrochemical system, the isolating mechanism, used to block the external environment, of the thermal runaway suppressor, located between the package component 32 and the electrochemical system 34, may be modified. For example, in the case of the jelly roll type lithium battery shown in FIG. 7B or the square type lithium battery shown in FIG. 7C, a film type thermal runaway suppressor 10 coating with the protecting layer 18 may be adapted to avoid the electrochemical system and the passivation composition supplier 12 or the polar solution supplier 14 contacting from each other. Also, the lithium battery with the aluminum plastic film can be applied.

Figure 7C:
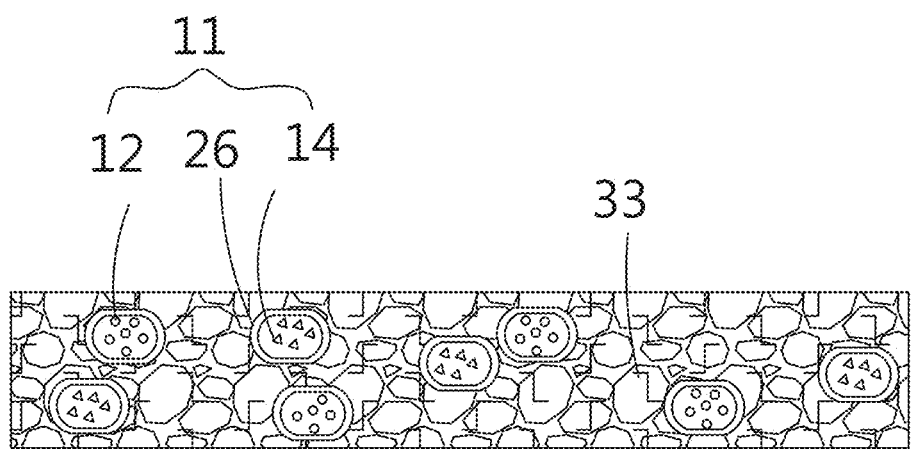
FIG. 7C is a schematic diagram of an embodiment of an active material layer mixed with the thermal runaway suppressant in accordance with the present invention.
Figure 7D:
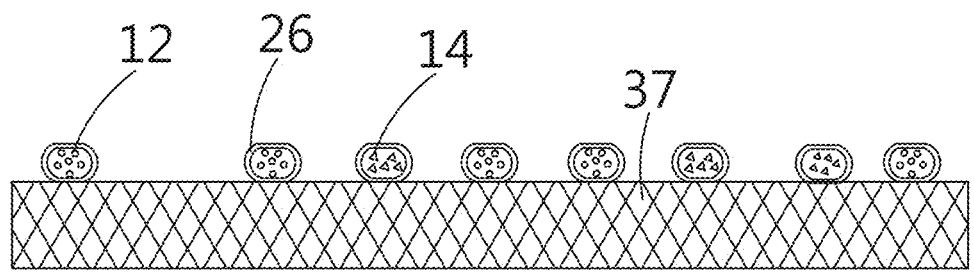
FIG. 7D is a schematic diagram of an embodiment of a separator coated with the thermal runaway suppressant in accordance with the present invention.
Figure 7E:
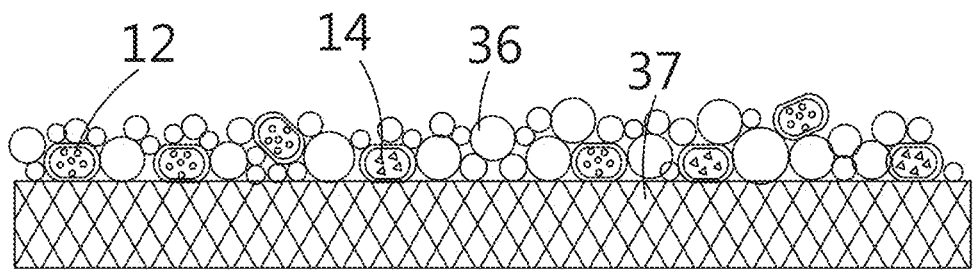
FIG. 7E is a schematic diagram of an embodiment of a separator wherein its surface has the ceramic powder and the thermal runaway suppressant in accordance with the present invention.
Figure 7F:
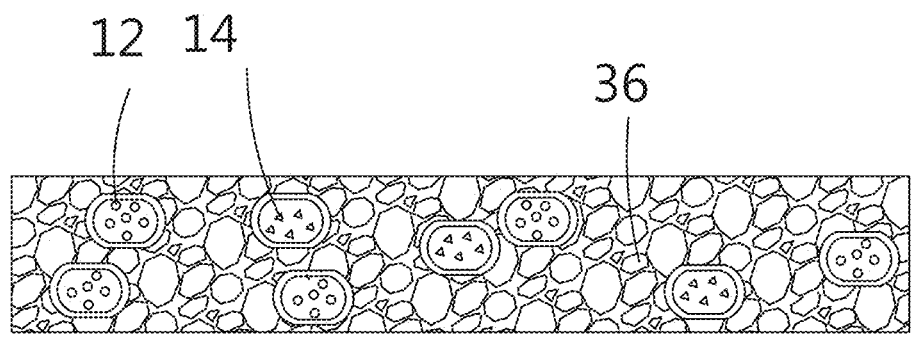
FIG. 7F is a schematic diagram of an embodiment of a ceramic powder mixed with the thermal runaway suppressant in accordance with the present invention.

Alternatively, the thermal runaway suppressant 11, using the capsule 26 as an isolating mechanism to encapsulate the passivation composition supplier 12 or the polar solution supplier 14, is mixed into the active material 33 of the electrochemical reaction system of the lithium battery, as shown in FIG. 7C; or coated on the surface of the polymer separator 37 of the lithium battery, as shown in FIG. 7D. Moreover, the surface of the polymer separator 37 can also be coated with the reinforcing material including the ceramic powder 36, as shown in FIG. 7E; or mixed with the ceramic powder 36 of the ceramic separator without a substrate, as shown in FIG. 7F. The ceramic powders 36 may have ion conductivity or without ion conductivity, or may be mixed in the electrolyte (whether liquid or solid). In these embodiments, the capsule 26 is utilized to act as a protection mechanism to prevent the passivation composition supplier 12 and the polar solution supplier 14 from reacting with each other or with the components in the electrochemical reaction system when the predetermined temperature is not reached.

Figure 8A:
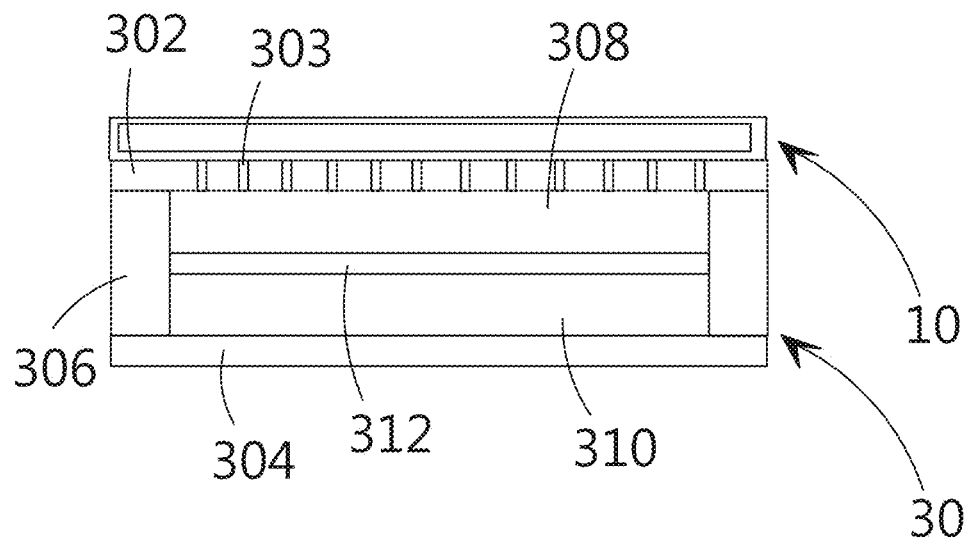
FIGS. 8A-8B are schematic diagrams of the embodiments of a lithium battery having a current collecting layer with the through holes to combine with the thermal runaway suppressor in accordance with the present invention.

Moreover, in case of the current collecting layer is served as the package of the lithium battery, please refer to FIG. 8A, the thermal runaway suppressor 10 of this invention is disposed on the open side, i.e. the outer surface, of the first current collecting layer 302 of the lithium battery 30. The first current collecting layer 302 includes a plurality of tiny through holes 303. Under such structure, due to the thermal runaway suppressor 10 is disposed outside the lithium battery 30, it will not affect the efficiency or composition of the electrochemical reaction system of the lithium battery 30. The thermal runaway suppressor 10 of this invention is disposed on the surface of the first current collecting layer 302 of the lithium battery 30. The first current collecting layer 302 may be the positive current collecting layer or the negative current collecting layer. When the temperature of the first current collecting layer 302 reaches to the predetermined temperature, such as 70-130° C., and the heat is transmitted to the thermal runaway suppressor 10, the thermal runaway suppressor 10 will release the metal ion (A), such as a non-lithium alkali metal ion, an alkaline earth metal ion or a combination thereof, and the amphoteric metal ion (B). The polar solution carries the metal ion (A) and the amphoteric metal ion (B) via the through holes 303 to the electrochemical reaction and performs reactions with the positive active material and the negative active material.

The lithium battery 30 includes a first current collecting layer 302, a second current collecting layer 304, a glue frame 306, an electrochemical reaction system, a separator 312 and an electrolyte system. The glue frame 306 is sandwiched between the first current collecting layer 302 and the second current collecting layer 304. One end of the glue frame 306 is adhered to the first current collecting layer 302 and the other end of the glue frame 306 is adhered to the second current collecting layer 304. The first current collecting layer 302, the second current collecting layer 304 and the glue frame 306 form an enclosed space (the through holes 303 are not considered here). The electrochemical reaction system arranged in the enclosed space, which includes a first active material layer 308 adjacent to the first current collecting layer 302 and a second active material layer 310 adjacent to the second current collecting layer 304. The first active material layer 308 and the second active material layer 310 are positive and negative active materials, respectively. The separator 312 is located between the first active material layer 308 and the second active material layer 310 and has ion conduction characteristics and electrical insulation properties. The electrolyte system is located in the enclosed space and impregnated or mixed in the first active material layer 308 and the second active material layer 310 for use in ion transfer. Moreover, the first active material layer 308 and second active material layer 310 may further include the electrically conductive materials and the adhesive materials. Since these parts are not technical features of this invention, the detailed description is omitted herein.

In addition, the material of the separator 312 of the lithium battery 30 is composed of a solid electrolyte, or an electrical insulation layer with holes formed of a polymer material with coating on its surface by the ceramic powders. Also, the separator 312 may also be formed by stacking only ceramic powders by using an adhesive. The ceramic powders may not have ion conductivity, or may also have ion conductivity. The through hole 303 penetrates the first current collecting layer 302 to connect with the upper and lower surfaces thereof. Therefore, one end of the through hole 303 is exposed to the external environment of the lithium battery 30, and the other end is connected to the electrochemical reaction system of the lithium battery 30.

The first current collecting layer 302, the second current collecting layer 304, and the glue frame 306 are used as packaging component of the battery. The glue frame 306 is made of a polymer material without particular requirements. As long as it can be adhered to the surfaces of the first and second current collecting layers 302, 304 and is durable to the electrolyte system. However, the thermosetting resin is preferable, for example, silicone. The negative active material may be a carbon material, a silicon-based material, or a mixture thereof. Examples of carbon materials include graphitized carbon materials and amorphous carbon materials, such as natural graphite, modified graphite, graphitized mesophase carbon particles, soft carbons, such as cokes, and some hard carbons. Silicon-based materials include silicon, silicon oxides, silicon-carbon composite materials, and silicon alloys.

Figure 8B:
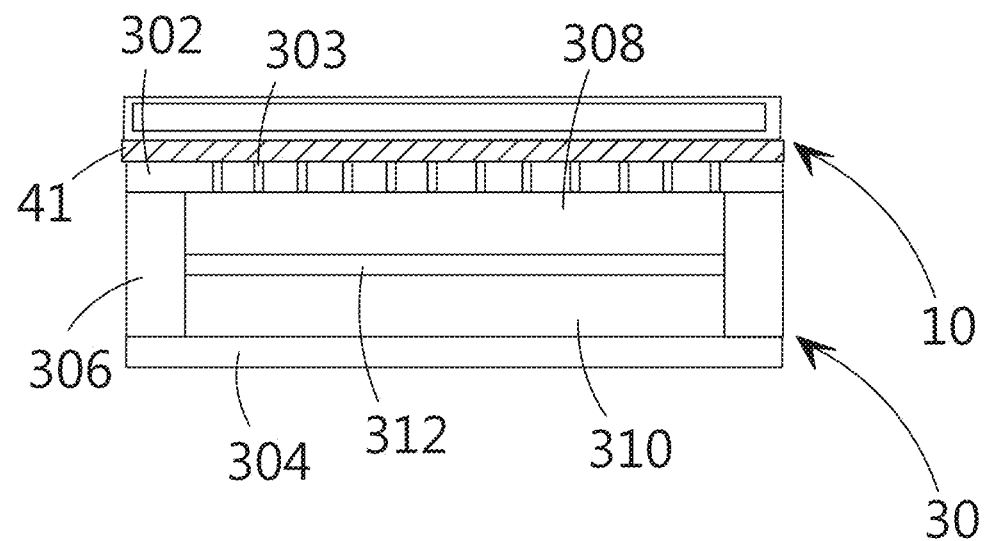

Furthermore, in order to prevent the supplier 12, 14 from interacting with the electrochemical reaction system caused via the pre-formed through holes, for example the electrolyte leaks to affect the supplier 12, 14 or the supplier 12, 14 is infiltrated to affect the electrochemical reaction system. Therefore, a removable gate layer 41 is disposed on the openings of the through holes 303 of the current collecting layer 302 to temporarily close the opening, as shown in FIG. 8B. The gate layer 41 is destroyed to expose the openings of the through holes. For example, the gate layer 41 is made of materials that can be destroyed by etching, and the materials for etching the gate layer 205 can be provided from the passivation composition supplier 12 or additional applying. The gate layer 41 may also be made of a heat-sensitive material, which can be melting by heating as the destructing mechanism, or the gate layer 41 can be made of a material, which can be acted with the polar solution and removed.

Figure 9:
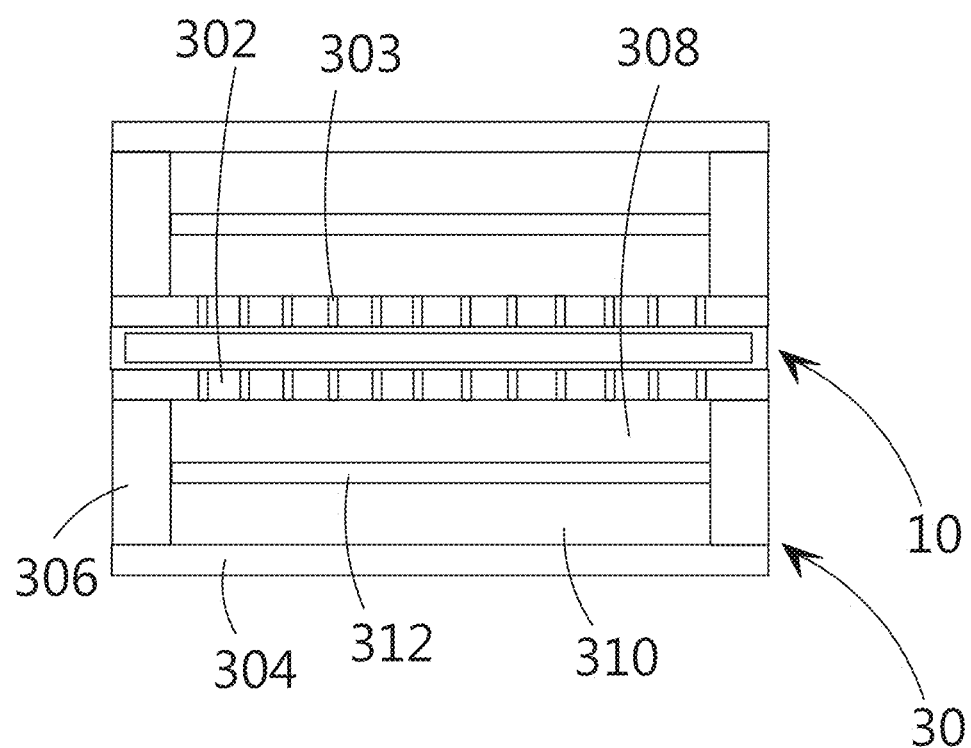
FIG. 9 is a schematic diagram of another embodiment of a lithium battery having a current collecting layer with the through holes to combine with the thermal runaway suppressor in accordance with the present invention.

Moreover, the thermal runaway suppressor 10 of this invention can be disposed between two lithium batteries, please see FIG. 9.

The thermal runaway suppressor/suppressant of the present invention can also be applied to the lithium battery, which its electrochemical reaction system had been exposed under the thermal runaway situation. The "exposed" mentioned here refers to a situation where there are seams or pores that allow the thermal runaway suppressant to seep thereof. For example, the thermal runaway suppressant of the present invention is used as the filling material of a fire extinguisher to be sprayed on the lithium battery during a thermal runaway issue to terminate the electrochemical reaction. Alternatively, the thermal runaway suppressant of the present invention is mixed within the cooling system of the lithium battery for an electric vehicle. When the power management system of the power battery detects an abnormal high temperature, the thermal runaway suppressant of the present invention can be injected into the cooling liquid. When the holes are exposed caused by the battery's swelling, the thermal runaway suppressant will enter the electrochemical reaction system to react, so as to suppress the thermal runaway state of the lithium battery.

Continuing, it is to verify that the influences of the thermal runaway suppressant of this invention acting to the positive active materials with lithium-ion extraction and the negative active materials with lithium-ion insertion. In this experiment, the positive active material is NMC811, and the negative active material is silicon-carbon.

Figure 10A:
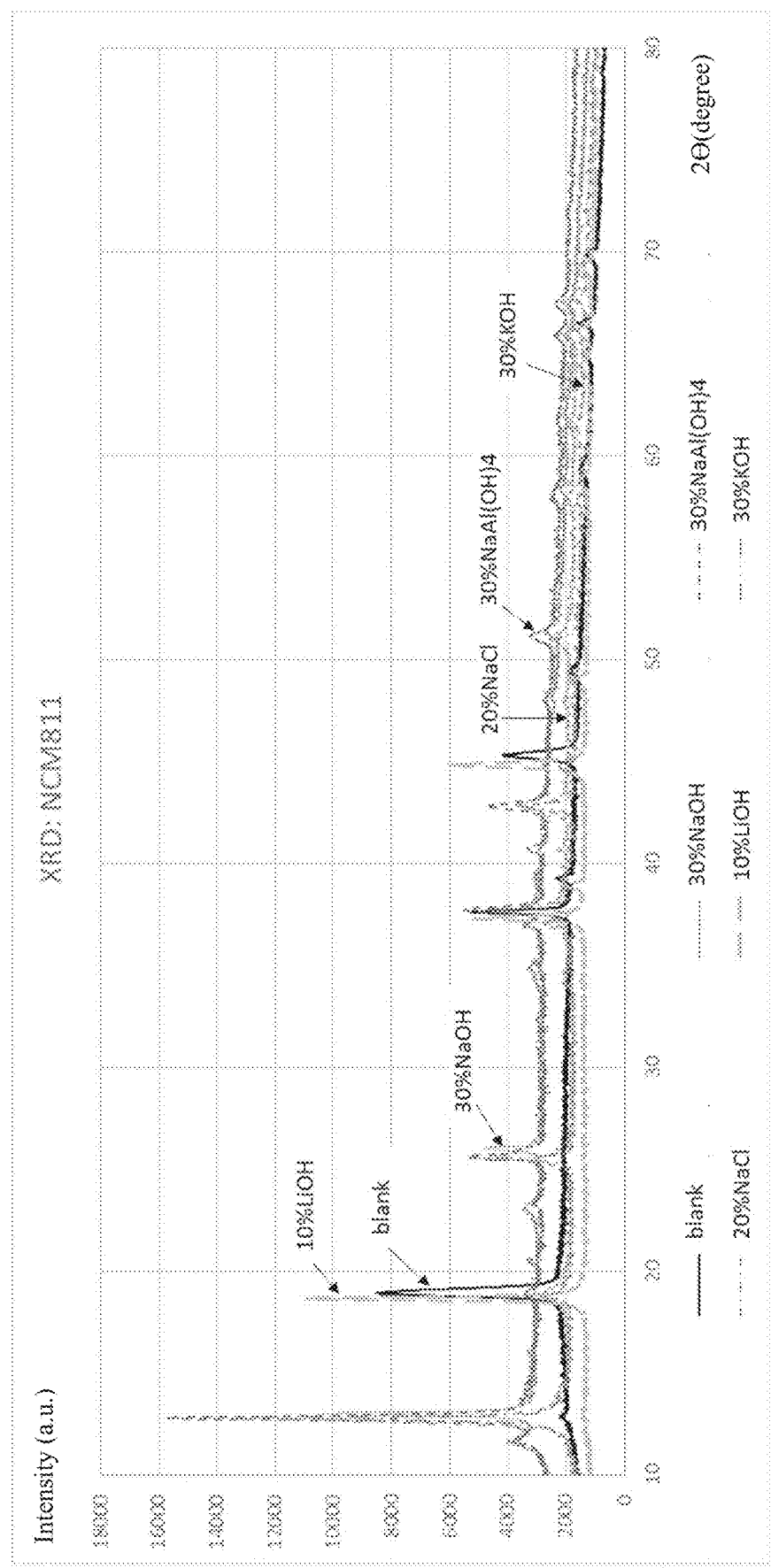
FIG. 10A is an XRD diffraction pattern in which the concentrations of 30% $NaOH_{(aq)}$, 30% $NaAl(OH)_{4(aq)}$, 30% $NaCl_{(aq)}$, 10% $LiOH_{(aq)}$, and 30% $KOH_{(aq)}$ react with the positive active material with lithium-ion extraction.

Please refer to FIG. 10A, which is an XRD diffraction pattern in which the concentrations of 30% NaOH, 30% NaAl(OH)$_4$, 30% NaCl, 10% LiOH, and 30% KOH react with the positive active material with lithium-ion extraction. It can be seen from the figure that after the NMC811 with lithium-ion extraction reacts with sodium ions, the characteristic peak (pointed by the arrows) of NMC811 is no longer existed, and the lattice structure has been changed due to the insertion of sodium or potassium ions. This may be because the sodium/potassium ions with larger sizes, heavier weight and higher potential energy obtain electrons on the surface of the positive active material to form sodium/potassium atoms. And by the absorption of thermal energy, they will migrate to the position of lithium-ion extraction or intercalations to form a structure with more stable and lower electrochemical potential energy.

Figure 10B:
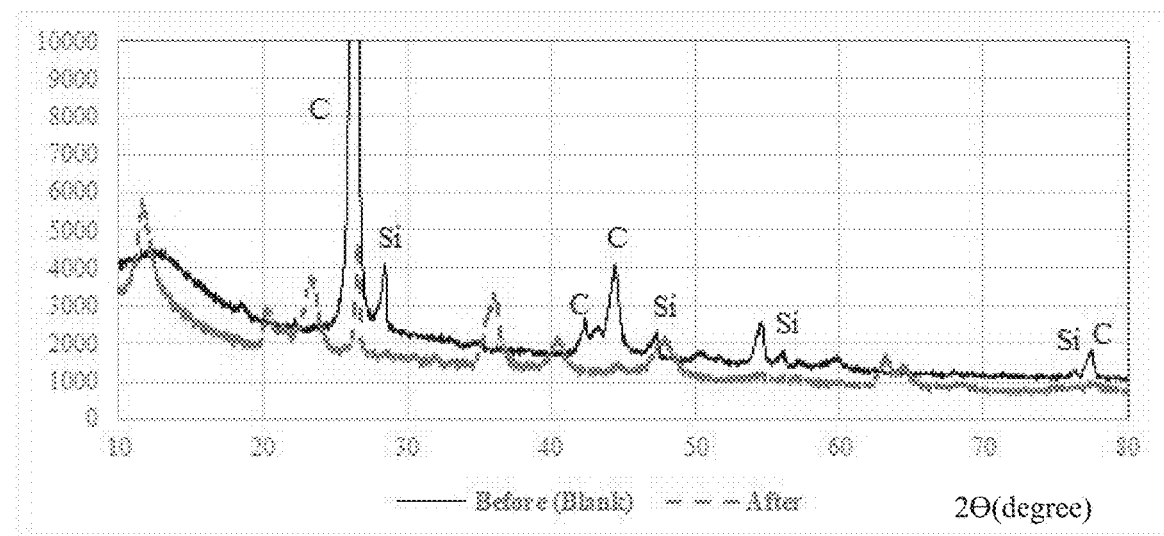
FIG. 10B is the XRD diffraction pattern before and after the negative active material with lithium-ion insertion is exposed to sodium/potassium ions and aluminum ions.

Please refer to FIG. 10B, which is the XRD diffraction pattern before and after the negative active material with lithium-ion insertion reacts with sodium/potassium ions and aluminum ions. It can be clearly found that the characteristic peaks representing Li—Si alloys have completely disappeared. It means that the Li—Si alloys have become polymer compounds with lower energy. It can be speculated that the sodium ions and the aluminum ions will form an inorganic polymer, i.e. geopolymer, with the silicon. The structure of this polymer is $M_n[-(SiO_2)_z-AlO_2]_n \cdot wH_2O$, where z is the molar ratio of Si/Al atoms, Z=1, 2, 3 or greater than 3, M is a cation, such as potassium ion (K$^+$) or sodium ion (Na$^+$), n is the degree of polymerization, and w is the molar amount of the crystal water. This inorganic compound is a closed frame structure similar to zeolite, so it can transfer the negative active materials with lithium-ion insertion into a state with higher electric potential and lower energy.

Figure 11A:
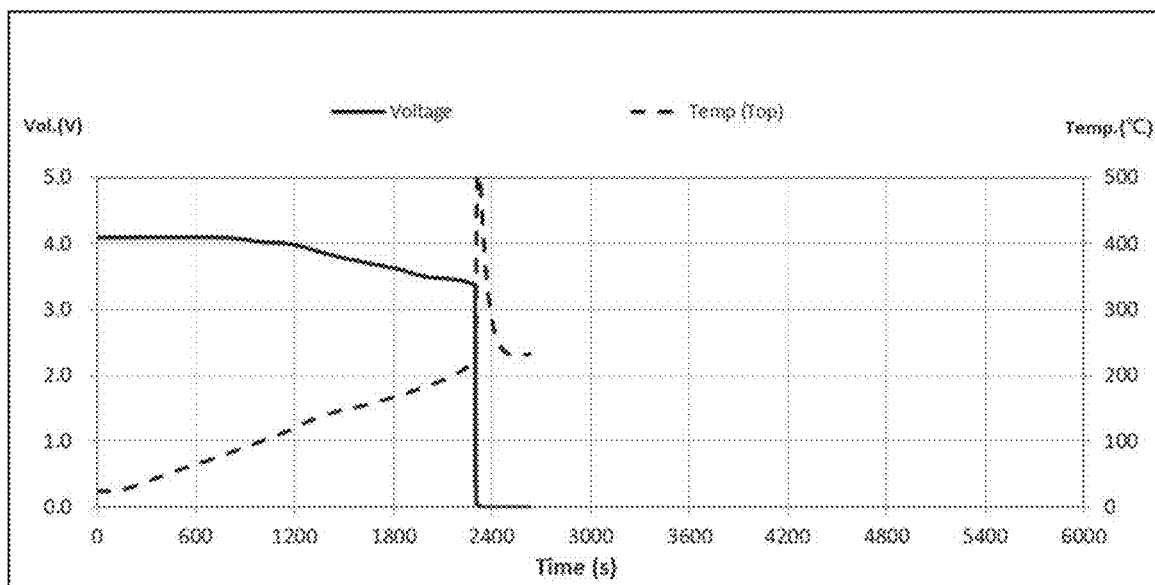
FIG. 11A shows the voltage and temperature curve for the thermal runaway testing of a conventional lithium battery cell.
Figure 11B:
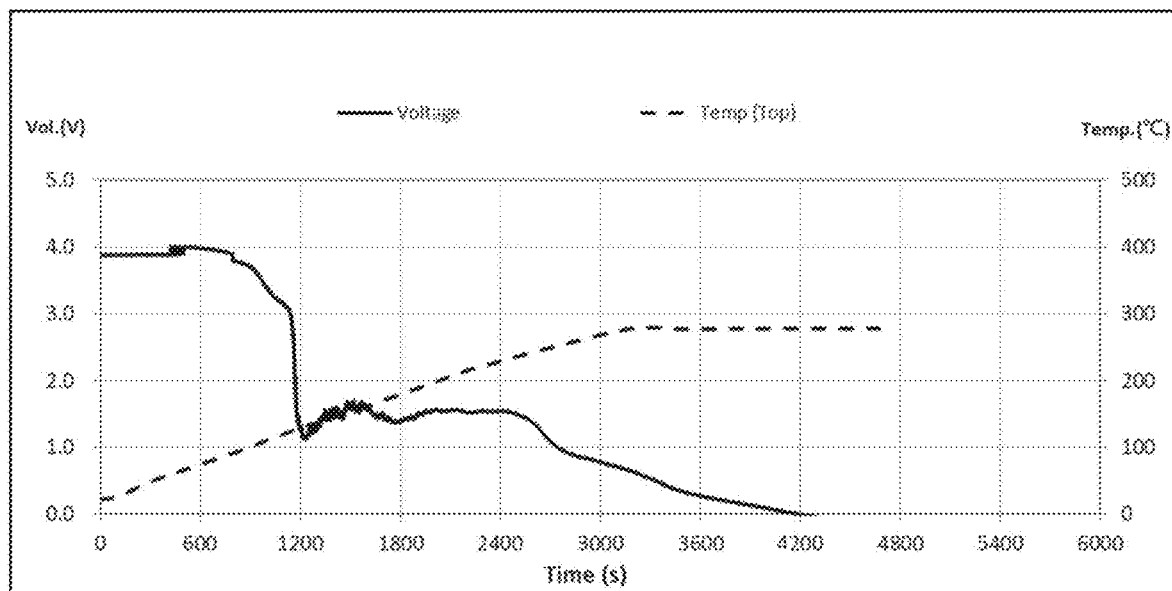
FIG. 11B shows the voltage and temperature curve for the lithium battery cell with thermal runaway suppression of the present invention.

Please refer to FIGS. 11A and 11B. FIG. 11A shows the voltage and temperature curve for the thermal runaway testing of a conventional lithium battery cell. FIG. 11B shows the voltage and temperature curve for the lithium battery cell performing thermal runaway suppression of the present invention. As shown in the figures, when the thermal runaway is occurred and generating heat, the voltage of the conventional lithium battery cell begins to drop down after the temperature reaches around 500° C. However, for the lithium battery cell with thermal runaway suppression of the present invention, the voltage begins to drop down after the temperature reaches around 100° C. by blocking the electrochemical reaction pathway to effectively avoid the thermal runaway.

Figure 12A:
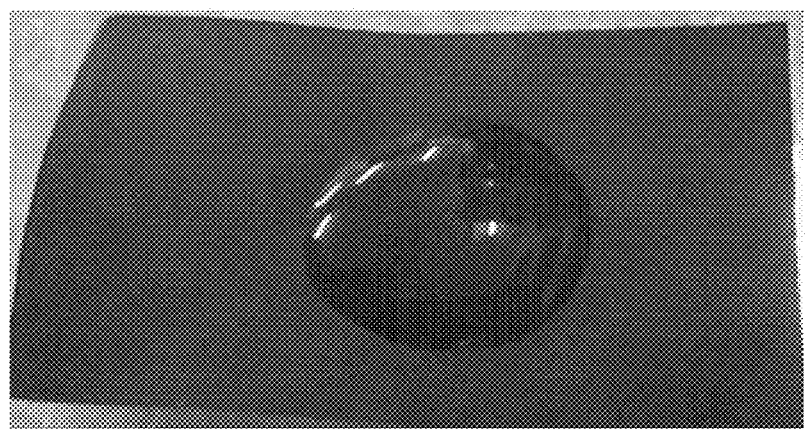
FIGS. 12A to 12C are images of the results of dropping different solutions selected from pure water, $NaOH_{(aq)}$, and $NaAl(OH)_4{-}_{(aq)}$ respectively on a cathode with a 100% SOC (state of charge).
Figure 12B:
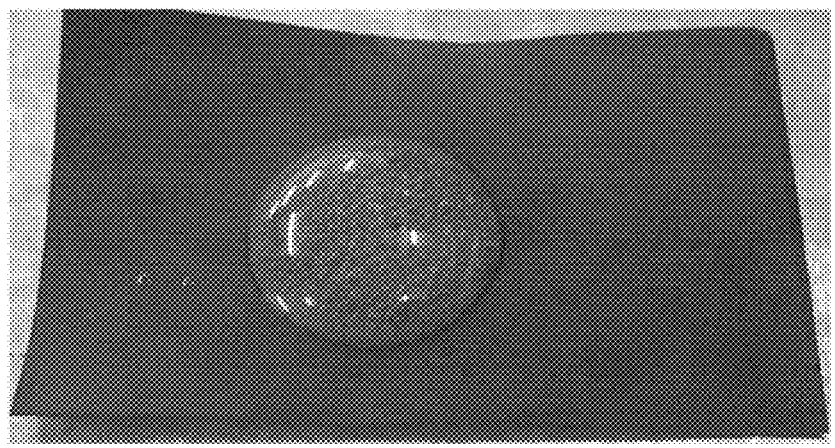
Figure 12C:

FIGS. 12A to 12C are the images for the results of dropping different solutions selected from pure water, NaOH$_{(aq)}$, and NaAl(OH)$_{4(aq)}$ respectively on a cathode with a 100% SOC (state of charge). In FIG. 12A, it can be seen that the cathode does not react with pure water. In FIGS. 12B and 12C, it can be seen that NaOH$_{(aq)}$ and NaAl(OH)$_{4(aq)}$ form the droplets in hydrophobic state on the surface of the cathode, and a plurality of tiny bubbles are presented in the droplets.

Figure 13A:
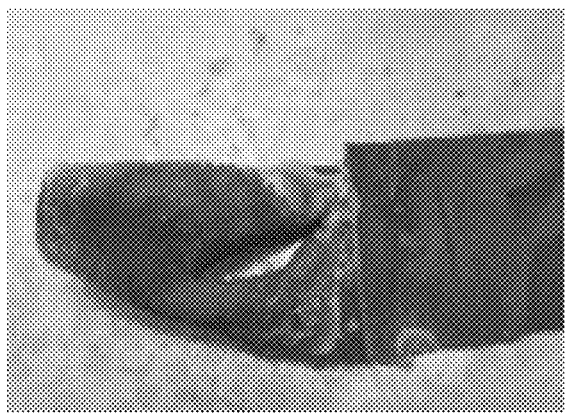
FIGS. 13A to 13C are the images for the results of dropping different solutions selected from pure water, $NaOH_{(aq)}$, and $NaAl(OH)_4{-}_{(aq)}$ respectively on a anode with a 100% SOC (state of charge).
Figure 13B:
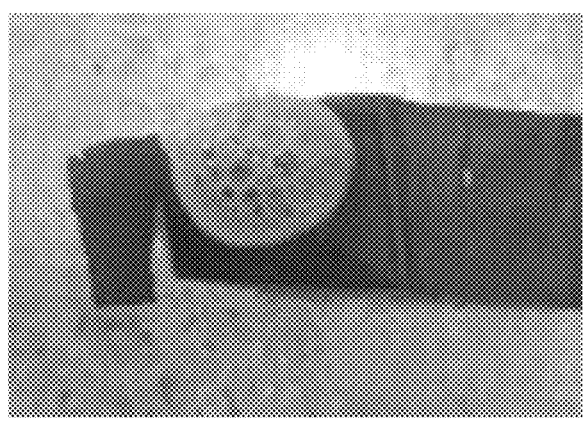
Figure 13C:
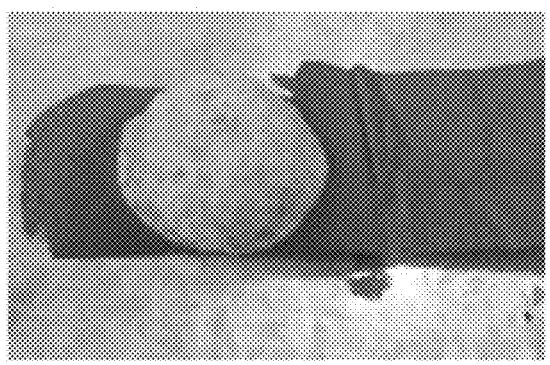
Figure 13D:
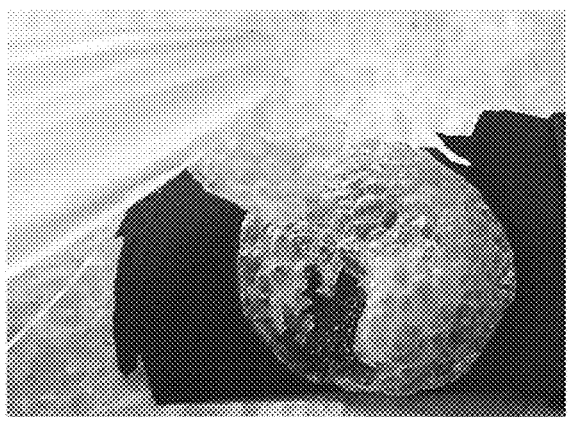
FIG. 13D is the image of FIG. 13C, which the foam is clamped by a jig.

FIGS. 13A to 13C are the images for the results of dropping different solutions selected from pure water, NaOH$_{(aq)}$, and NaAl(OH)$_{4(aq)}$ respectively on an anode with a 100% SOC (state of charge). In FIG. 13A, it can be seen that the remaining lithium in the anode reacts strongly to pure water and causes the anode to crack. In FIGS. 13B and 13C, it can be seen that NaOH$_{(aq)}$ and NaAl(OH)$_{4(aq)}$ form the inorganic polymer with bubbles, such like a foam, on the surface of the anode. Also, a part of the inorganic polymer can be clamped by a jig, as shown in FIG. 13D.

Figure 14A:
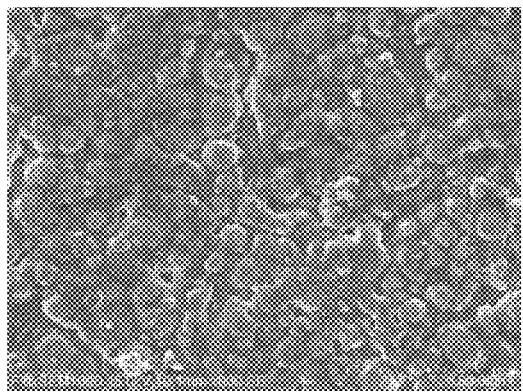
FIGS. 14A and 14B are SEM diagrams of the cathode with a 40% SOC and with a 100% SOC respectively, which 30% sodium hydroxide was dropped over about 1 hour.
Figure 14B:
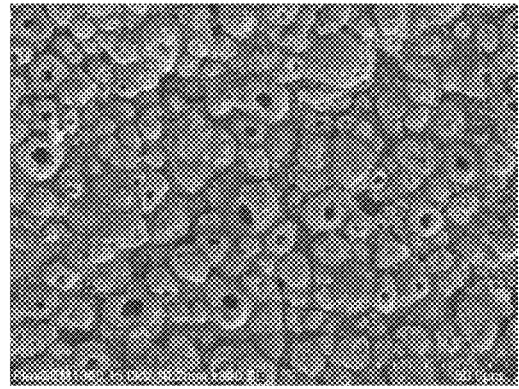

FIGS. 14A and 14B are SEM diagrams of the cathode with a 40% SOC and with a 100% SOC respectively, which 30% sodium hydroxide was dropped over about 1 hour, DMC (dimethyl carbonate) and a pure water were used for surface cleaning, and then dried at 60° C. for 8 hours. As shown in the figures, for the cathode with a 40% SOC, due to the lower lithium-ion extractions, the situation of sodium ions are inserted to the positive of the lithium-ion extractions of the cathode are not significant. However, the undulations of the topography of the surface for the cathode become significant. For the cathode with a 100% SOC, due to the higher lithium-ion extractions, the situation of sodium ions are inserted to the positive of the lithium-ion extractions of the cathode are very significant. The relocation of the lattice and the undulations of the topography of the surface for the cathode with a 100% SOC are also very significant. And it can be observed that parts of the surface even has a cracked state.

Figure 15A:
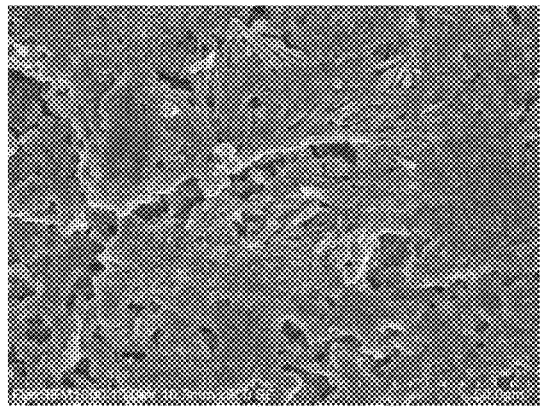
FIGS. 15A and 15B are SEM diagrams of the anode with a 40% SOC and with a 100% SOC respectively, which 30% sodium hydroxide was dropped over about 1 hour.
Figure 15B:
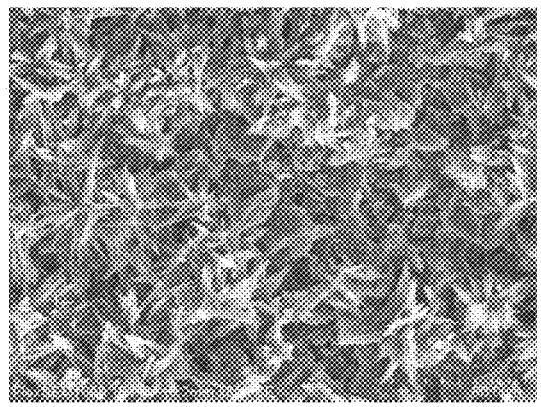

FIGS. 15A and 15B are SEM diagrams of the anode with a 40% SOC and with a 100% SOC respectively, which 30% sodium hydroxide was dropped over about 1 hour, DMC and a pure water were used for surface cleaning, and then dried at 60° C. for 8 hours. As shown in the figures, the sodium hydroxide makes parts of the anode with a 40% SOC form an inorganic polymer (geopolymer), and it also has a needle-like structure of the colloidal silica acid. For the anode with a 100% SOC, the needle-like structure is more obvious.

Figure 16A:
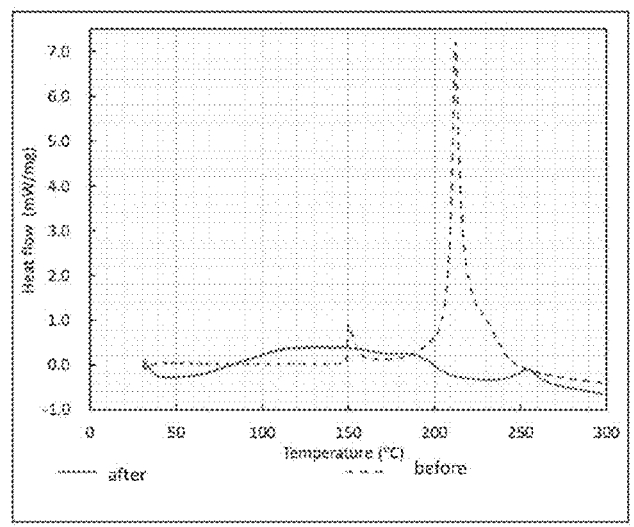
FIGS. 16A and 16B are thermograms of the differential scanning calorimeter for the cathode and the anode using 20% $NaAl(OH)_4{-}_{(aq)}$.
Figure 16B:
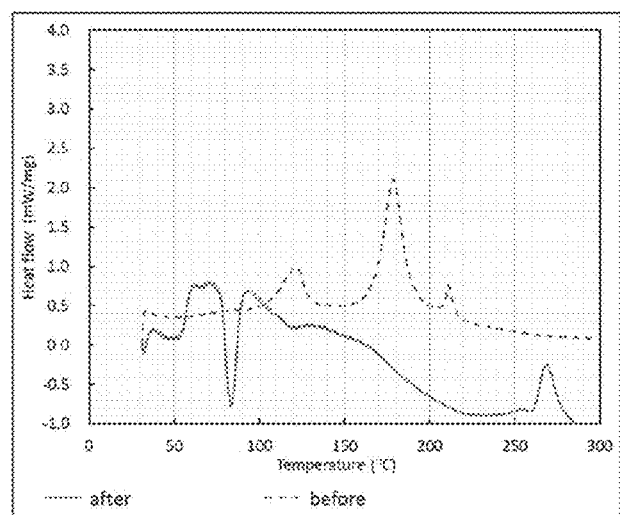

Further, to verify the above-mentioned lower energy of the cathode and the anode, please refer to FIGS. 16A and 16B, which are thermograms of the differential scanning calorimeter for the cathode and the anode using 20% NaAl(OH)$_4{}^-{}_{(aq)}$. It can be clearly seen that a peak of the heat flow of the cathode at about 210° C. has obviously disappeared, see FIG. 16A, and a peak of the heat flow of the anode at about 180° C. has obviously disappeared, see FIG. 16B.

Accordingly, the present invention provides a thermal runaway suppressant of lithium batteries and the related applications. When the temperature of the lithium battery reaches to the predetermined temperature, such as 70-130° C., the isolating mechanism is failed and the polar solution carries the metal ion (A), such as a non-lithium alkali metal ion, an alkaline earth metal ion or a combination thereof, and the amphoteric metal ion (B) into the electrochemical reaction system and react with the positive active material with lithium-ion extraction and the negative active material with lithium-ion insertion to a state with lower energy. The voltage of the whole battery is decreased and the electrochemical reaction pathway is blocked to prevent the thermal runaway from occurring. Moreover, comparing to the conventional arts, the method for suppressing thermal runaway of the invention is performed directly on the active materials that generate the maximum energy to cause the thermal runaway and being the main reaction body of the entire electrochemical reaction. Also, the metal ion (A), such as a non-lithium alkali metal ion, an alkaline earth metal ion or a combination thereof, will be driven by acquired thermal energy to fill the positive of the lithium-ion extraction or intercalation, and relocate the lattice to form a new stable state, and at the same time, the thermal energy is consumed. Also, the release of oxygen caused by structural instability and the chain uncontrollable reaction derived therefrom are suppressed. The negative active materials with lithium-ion insertion will act with the metal ion (A), such as a non-lithium alkali metal ion, an alkaline earth metal ion or a combination thereof, and the aluminum ion to form a polymer compounds with lower energy. Therefore, both of the positive active materials and the negative active materials would stay with lower energy to improve safety of the lithium batteries, and terminate the thermal runaway of the lithium battery effectively and quickly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A thermal runaway suppressant, comprising:
   a passivation composition supplier, being anhydrous, for releasing a metal ion (A) and an amphoteric metal ion (B), and wherein the metal ion (A) is selected from a non-lithium alkali metal ion, an alkaline earth metal ion or a combination thereof;
   a polar solution supplier for supplying a polar solution, being a water-releasing compound decomposed endothermically; and
   an isolating mechanism, being a capsule made of a dissolvable material, which is dissolved in the polar solution, encapsulating both of the passivation composition supplier and the polar solution supplier to separate and prevent the passivation composition supplier and the polar solution supplier from contacting directly under a predetermined temperature, when a temperature of the thermal runaway suppressant reaches to the predetermined temperature, the isolating mechanism (26) is failed and the polar solution supplier releases a polar solution to act with the passivation composition supplier to dissociate and release the metal ion (A) and the amphoteric metal ion (B), the polar solution serves as transmission medium and carries the metal ion (A) and the amphoteric metal ion (B) to a positive active material and a negative active material of a lithium battery for passivation and to terminate an electrochemical reaction;
   wherein the capsule (26) is made of a material selected from gelatin, gum arabic, chitosan, sodium caseinate, starch, lactose, maltodextrin, poly-1-lysine/alginate, polyethyleneimine/alginate, calcium alginate and polyvinyl alcohol;
   wherein the polar solution is water, and wherein the passivation composition supplier includes a compound capable of providing the amphoteric metal ion (B), the compound including one of $AlBr_3$, $AlI_3$, $Al(NO_3)_3$, $AlClO_4$, $AlF_3$, $NaAl(OH)_4$ or $Zn(OH)_2$.

2. The thermal runaway suppressant of claim 1, wherein the metal ion (A) is selected from a sodium ion, a potassium ion or a combination thereof.

3. The thermal runaway suppressant of claim 1, wherein the predetermined temperature is 70-130° C.

4. The thermal runaway suppressant of claim 1, wherein the passivation composition supplier includes a compound capable of providing the metal ion (A), the compound including one of NaOH or KOH.

5. A lithium battery capable of suppressing thermal runaway, including an electrochemical reaction system, wherein the electrochemical reaction system includes a positive active material layer, a negative active material layer, a separator and an electrolyte system, the separator is sandwiched between the positive active material layer and the negative active material layer and the electrolyte system is filled in the electrochemical reaction system; and wherein any one of the positive active material layer, the negative active material layer, or the separator, and the electrolyte system includes the thermal runaway suppressant of claim 1.

6. A lithium battery capable of suppressing thermal runaway, comprising:
a package component, sealing and housing an electrochemical reaction system; and
a thermal runaway suppressor, disposed outside of the electrochemical reaction system, comprising:
a passivation composition supplier, being anhydrous, for releasing a metal ion (A) and an amphoteric metal ion (B), and wherein the metal ion (A) is selected from a non-lithium alkali metal ion, an alkaline earth metal ion or a combination thereof;
a polar solution supplier, being a water-releasing compound decomposed endothermically for releasing a polar solution; and
an isolating mechanism, being a capsule made of a dissolvable material, which is dissolved in the polar solution, encapsulating the passivation composition supplier and/or the polar solution supplier to separate and prevent the passivation composition supplier and the polar solution supplier from contacting directly under a predetermined temperature, when the temperature of the thermal runaway suppressor reaches to a predetermined temperature, the isolating mechanism is failed and the polar solution supplier releases a polar solution to act with the passivation composition supplier to dissociate and release the metal ion (A) and the amphoteric metal ion (B), the polar solution carries the metal ion (A) and the amphoteric metal ion (B) to a positive active material and a negative active material of a lithium battery for passivation and to terminate an electrochemical reaction;
wherein the capsule is made of a material selected from gelatin, gum arabic, chitosan, sodium caseinate, starch, lactose, maltodextrin, poly-1-lysine/alginate, polyethyleneimine/alginate, calcium alginate and polyvinyl alcohol;
wherein the passivation composition supplier includes a compound capable of providing the amphoteric metal ion (B), the compound including one of $AlBr_3$, $AlI_3$, $Al(NO_3)_3$, $AlClO_4$, $AlF_3$, $NaAl(OH)_4$ or $Zn(OH)_2$; and
wherein the thermal runaway suppressor is disposed outside of the package component, and the package component includes multiple through holes for allowing the thermal runaway suppressor entering into the electrochemical reaction system for the passivation.

7. The lithium battery of claim 6, wherein the multiple through holes are covered by a removable gate layer, which closes an opening of the through hole.

8. The lithium battery of claim 7, wherein the gate layer is composed of a thermosensitive decomposition material or a material reacted with the passivation composition supplier or the polar solution supplier to be removed.

9. The lithium battery of claim 7, wherein the package component is formed by a first current collecting layer, a second current collecting layer and a glue frame, wherein the glue frame is sandwiched between the first current collecting layer and the second current collecting layer, the first current collecting layer (302) or the second current collecting layer includes the multiple through holes (303), and each of the multiple through holes penetrates the first current collecting layer (302) to connect with an upper and a lower surface of the first current collecting layer (302) such that one end of the multiple through hole (303) is exposed to an external environment of the lithium battery (30), and another end is connected to the electrochemical reaction system of the lithium battery (30), and the thermal runaway suppressor is disposed on an open surface of the current collecting layer or the second current collecting layer to cover the gate layer; and
wherein when the temperature of the first current collecting layer (302) reaches to a predetermined temperature, the polar solution carries the metal ion (A) and the amphoteric metal ion (B) via the multiple through holes (303) to the electrochemical reaction system and performs reactions with the positive active material and the negative active material for the passivation.

10. The lithium battery of claim 6, wherein the predetermined temperature is 70-130° C.

11. The lithium battery of claim 6, wherein the passivation composition supplier includes a compound capable of providing the metal ion (A), the compound including one of NaOH or KOH.

12. A thermal runaway suppressant, comprising:
a passivation composition supplier, for releasing a metal ion (A) and an amphoteric metal ion (B), and wherein the metal ion (A) is selected from a non-lithium alkali metal ion, an alkaline earth metal ion or a combination thereof, wherein the passivation composition supplier is anhydrous;
a polar solution supplier, being a water-releasing compound decomposed endothermically for releasing a polar solution; and
an isolating mechanism, encapsulating the passivation composition supplier and/or the polar solution supplier to separate and prevent the passivation composition supplier and the polar solution supplier from contacting directly under a predetermined temperature, and the isolating mechanism is a polymer film with multiple through holes (25), when the temperature of the thermal runaway suppressant reaches to a predetermined temperature, and the polar solution supplier releases a polar solution to contact to the passivation composition supplier (12) via the multiple through holes (25) as a transmission path and act with the passivation composition supplier to dissociate and release the metal ion (A) and the amphoteric metal ion (B), the polar solution serves as a transmission medium and carries the metal ion (A) and the amphoteric metal ion (B) to a positive active material and a negative active material of a lithium battery and the metal ion (A) and the amphoteric metal ion (B) react with the positive active material and the negative active material for passivation and to terminate an electrochemical reaction;

wherein both of the passivation composition supplier and polar solution supplier are in a non-fluid state under the predetermined temperature; and wherein the polymer film includes a film-forming agent selected from polytetrafluoroethylene (PTFE), poly (vinylidene fluoride-hexafluoropropylene) (PVDF-HFP), polyurethane (PU), styrene-butadiene rubber (SBR), and carboxyl methyl cellulose (CMC).

13. A lithium battery capable of suppressing thermal runaway, comprising:

an electrochemical reaction system;

a package component, sealing and housing the electrochemical reaction system; and a two-part thermal runaway suppressor, being a liquid mixture of a first part and a second part to dissociate and release a metal ion (A) and an amphoteric metal ion (B) to the electrochemical reaction system, wherein the first part is a passivation composition supplier and the second part is a polar solution supplier, wherein the polar solution supplier is for supplying a polar solution that is a water-releasing compound decomposed endothermically, and the polar solution is water; and the passivation composition supplier is anhydrous and is dissociated in the polar solution for releasing the metal ion (A) and the amphoteric metal ion (B), and wherein the metal ion (A) is selected from a non-lithium alkali metal ion, an alkaline earth metal ion or a combination thereof;

the two-part thermal runaway suppressor further comprising an isolating mechanism, the isolating mechanism being a capsule made of a dissolvable material dissolved in the polar solution, the capsule encapsulating the passivation composition supplier and/or the polar solution supplier to separate and prevent the passivation composition supplier and the polar solution supplier from contacting directly under a predetermined temperature; and wherein when a temperature of the thermal runaway suppressant reaches to the predetermined temperature, the isolating mechanism (26) is failed and the polar solution supplier releases a polar solution to act with the passivation composition supplier to dissociate and release the metal ion (A) and the amphoteric metal ion (B), the polar solution serves as a transmission medium and carries the metal ion (A) and the amphoteric metal ion (B) to a positive active material and a negative active material of the lithium battery to terminate an electrochemical reaction.

* * * * *